United States Patent [19]

Kitamura et al.

[11] 3,844,464

[45] Oct. 29, 1974

[54] TAPE RECORDER AUTOMATIC STOP MECHANISM

[76] Inventors: Takemi Kitamura; Ason Takaki, both of No. 25-1, Aza Nishimachi, Yamada, Kawagoe-Shi, Saitama, Japan

[22] Filed: Nov. 27, 1972

[21] Appl. No.: 309,850

[30] Foreign Application Priority Data

Nov. 27, 1971 Japan .............................. 46-110680

[52] U.S. Cl. ........... 226/174, 226/187, 242/55.19 A

[51] Int. Cl. ........................ B65h 17/20, B65h 17/48

[58] Field of Search ...... 242/55.19 A; 274/4 B, 4 D; 226/174, 186, 24, 35, 45, 181, 182, 183, 187, 188; 179/100.2 Z

[56] References Cited

UNITED STATES PATENTS

| | | | |
|---|---|---|---|
| 3,009,024 | 11/1961 | Eash | 274/4 B X |
| 3,126,162 | 3/1964 | MacKenzie | 242/55.19 A |
| 3,217,997 | 11/1965 | Lundgren et al. | 179/100.2 Z X |
| 3,633,920 | 1/1972 | Ban | 242/55.19 A |

FOREIGN PATENTS OR APPLICATIONS

| | | | |
|---|---|---|---|
| 43-12709 | 2/1966 | Japan | 242/55.19 A |

*Primary Examiner*—John W. Huckert
*Assistant Examiner*—John M. Jillions
*Attorney, Agent, or Firm*—Sughrue, Rothwell, Mion, Zinn & Macpeak

[57] ABSTRACT

A slide bar is held in latched position during insertion of a tape cartridge within a tape recorder to permit recorder operation but released automatically at the end of tape play to disengage the pinch roller from the drive capstan regardless of whether the cartridge is removed or not.

4 Claims, 4 Drawing Figures

TAPE RECORDER AUTOMATIC STOP MECHANISM

BACKGROUND OF THE INVENTION

Field of the Invention

This invention relates to an automatic stop mechanism of a tape recorder usable for an endless tape cartridge.

SUMMARY OF THE INVENTION

This invention provides an automatic stop mechanism in a tape recorder usable for an endless tape cartridge with a pinch roller biased forward by a spring therein, in which a single pushing-in action achieves two actions necessary for recording (or reproducing) operation, i.e., insertion of cartridge and pressure-contact of pinch roller to capstan, and the detection of sensing foil on tape automatically causes the tape to stop running and further releases the continuous contact of the pinch roller to the capstan so as to prevent the pinch roller from deformation and the tape from suffering damage.

DESCRIPTION OF THE PREFERRED EMBODIMENT

Figure 1:
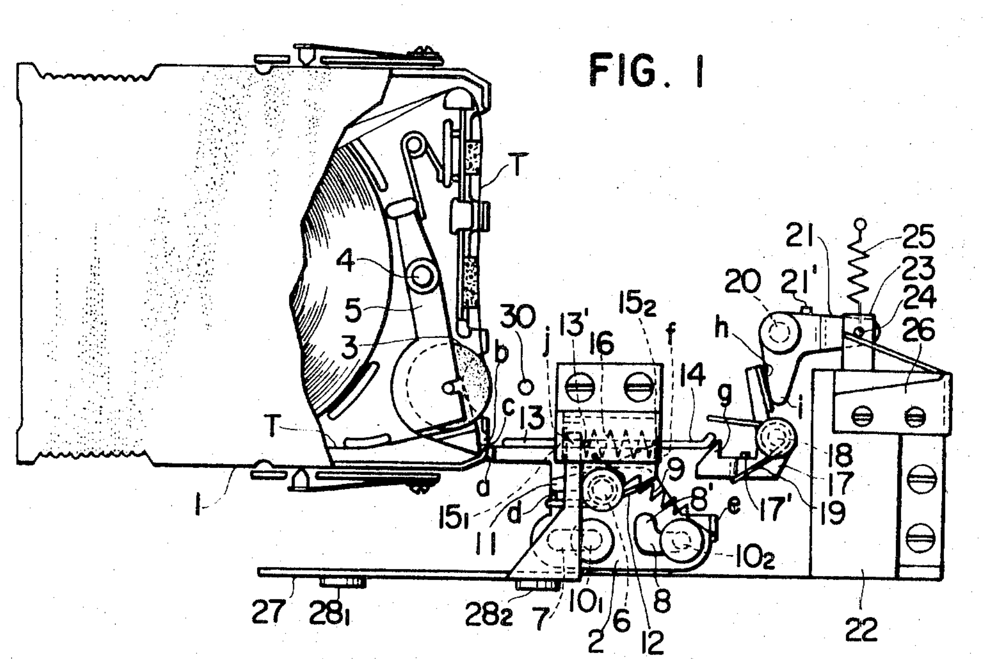
FIGS. 1 and 3 are plan views of an embodiment of this invention, wherein the cartridge is illustrated with all main parts except for its cover.
Figure 2:
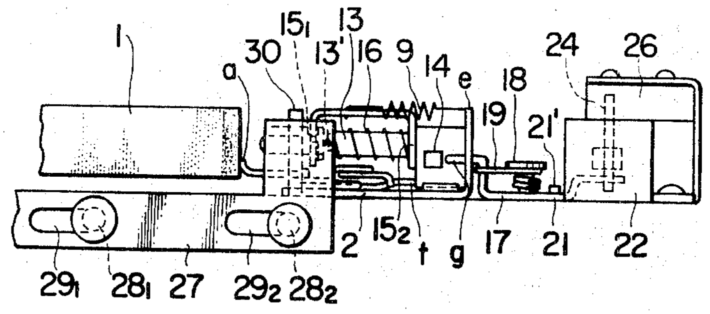
FIG. 2 is a side view of the embodiment of this invention shown in FIG. 1.

Referring to the drawings, the explanation of an embodiment of this invention will be described as follows. In FIGS. 1 and 2, cartridge 1 is inserted from the front of tape recorder (from the left side of the drawings), in which the projection *a* of slide plate 2 contacts the front face of the cartridge 1. Pinch roller 3 in the cartridge 1 is rotatably supported at one end of lever 5 pivotably mounted about shaft 4, which has an end face *c*, facing opening *b* in the front of the cartridge 1, at the edge of the one end thereof. Lever 5 is biased in the counter-clockwise direction by a spring mounted at the other end thereof. The slide plate 2 has, in addition to projection *a*, bent-up portions *d* and *e*, shaft 6, slot 7 abd bent slot 8 and is biased by spring 9 to the left of the drawing so as to cause pins $\mathbf{10_1}$ and $\mathbf{10_2}$ to contact right hand edges of the slot 7 and the bent slot 8. Furthermore, lever 11, forming a first latch with locking end *f* at one end thereof engageable with the stop between the wide and narrow portions of slide bar 13, and is pivoted on the shaft 6; being biased by spring 12 in the counterclockwise direction and having the other end thereof engaged with the bent-up portion *d* of slide 2. Slide bar 13 has an opening 14 at the wide portion thereof, which is formed on the right side in the drawing, and has pin 13' at the narrow portion thereof, which is formed on the left side in the drawing and inserted in guide apertures $\mathbf{15_1}$ and $\mathbf{15_2}$, and is biased by spring 16 so as to form a stop according to the engagement of the width-step portion thereof with the guide aperture $\mathbf{15_2}$. In addition, the left hand portion (in the drawing) of the slide bar 13 faces the opening b of the cartridge. Crank lever 17 forms a second latch, which has claw *g* for locking at a height corresponding to the opening 14 at one end of the slide bar 13, and end face h at the side of the other end thereof, is pivoted on shaft 18 and is biased by spring 19 in the clockwise direction so as to contact stop member 17'. Crank lever 21, is pivoted on shaft 20 with the engagement of one end thereof with the end face *h* and is connected at the other end thereof to pin 24 fixed to movable armature 23 of solenoid 22. Lever 21 is biased by spring 25 in the counter-clockwise direction so as to contact fixed stop member 21'. Switch 26 is operated by the downward movement of the pin 24, FIG. 1. Manual operating bar 27 is slidably maintained by the engagement of pins $\mathbf{28_1}$ and $\mathbf{28_2}$ with slots $\mathbf{29_1}$ and $\mathbf{29_2}$ and the top end j thereof is positioned between the pin 13' and the guide aperture $\mathbf{15_1}$. In the drawings, numeral 30 indicates a capstan and T indicates the tape.

Figure 3:
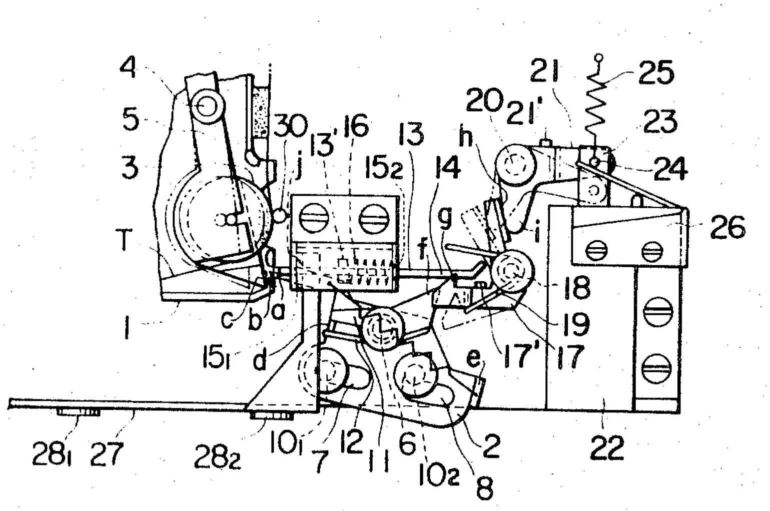
Figure 4:
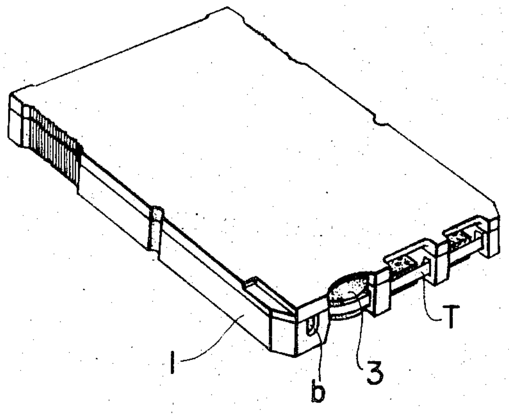
FIG. 4 is a perspective view of a part of the cartridge forming one embodiment of this invention.

The operation of the embodiment of this invention will be described in the following, with reference to the drawings. In FIGS. 1 and 2, the cartridge 1 is inserted from the front of the tape recorder (at the left of the drawings). When the cartridge 1 is inserted from the position thereof shown in FIGS. 1 and 2, the projection a is pushed by the front of the cartridge 1 so that the slide plate 2 is slid backwards (to the right in the drawings) guided by the pins $\mathbf{10_1}$ and $\mathbf{10_2}$ in the slot 7 and the straight portion of the bent slot 8 and the locking end *f* of the lever 11 thereon pushes the lower step portion between the wide and narrow portions of the slide bar 13 so as to move the slide bar 13 backwards (to the right in the drawing), and then lock it by the engagement of the claw *g* of the crank lever 17 with the opening 14, as shown in FIG. 3. To further insert the cartridge 1 moverover, the slide plate 2 is rotated about the pin $\mathbf{10_1}$ in the clockwise direction, and pin $\mathbf{10_2}$ moves into slot 8' of bent slot 8 so that the locking end f is disengaged from the step portion of the slide bar 13, and the slide plate 2 stops its rotation according to the engagement of the pin $\mathbf{10_2}$ with the end of the bent portion 8' of the bent slot 8, as shown in FIG. 3, thus the pinch roller 3 is in pressure-contact with the capstan 30 so as to feed the table T, FIG. 3. Next, when sensing foil on running tape comes in contact with sensing pole (not shown), the plunger 22 in FIG. 3 is operated to draw the movable armature 23 so that the crank lever 21 connected thereto by the pin 24 is pivoted in the clockwise direction and thereby the crank lever 17 is pivoted in the counter-clockwise direction which results in disengagement of the claw *g*, which normally locks the slide bar 13, from the opening 14. Then, slide bar 13 is moved by the spring 16 towards the left in the drawing and the top end thereof enters into the cartridge 1 through the opening *b* so as to push and move the end face *c* of lever 5 backwards, thus disengaging pinch roller 3 from the capstan 30 so as to stop the running of the tape and stop the recording (or reproducing) operation, while maintaining the cartridge 1 inserted in the tape recorder.

In addition, according to the movement of the movable armature 23 drawn by the plunger 22, the pin 24 pushes the contact member of the switch 26 to open the plunger circuit and then the pin 24 is drawn back by the spring 25 to the position shown in the drawing.

When the cartridge 1 is drawn out from the position in FIG. 3 to the position in FIG. 1, the projection a shifts to the left in the drawing by the spring 9 and slide plate 2 is returned to its position shown in FIG. 1. According to the return of the slide plate 2, the latch *f* of lever 11 contacts the wide portion of the slide bar 13 and the lever 11 is rotated clockwise about the shaft 6 of the slide plate 2 ending the movement of the slide plate 2 at its position shown in FIG. 1. To again start the recording (or reproducing) operation, in the dotted line condition of the pinch roller 3 and the slide bar 13, FIG. 3, wherein the recording (or reproducing) operation is stopped by loading the cartridge 1, the recording (or reproducing) operation is able to be re-started by pushing the manual operating bar 27 so that the top end *j* thereof makes the pin 13' of the slide bar 13 move backwards from the dotted line position shown to the full line position (towards the right in the drawing) and thus the pinch roller 3 engages the capstan 30.

As described above, according to this invention, it is possible to automatically stop the recording (or reproducing) operation, in a tape recorder usable for an endless tape cartridge including a pinch roller movable forwards and backwards, and to prevent deformation of pinch roller and tape damage owing to the continuous pressure-contact of pinch roller to capstan, because pinch roller is disengaged from capstan when stopped in spite of keeping the endless tape cartridge loaded. Furthermore, it is possible to easily restart the recording (or reproducing) operation, and since the locking end on the slide plate is disengaged from the slide bar during cartridge loading, a remarkably slight effort is all that is required to draw out the cartridge from the tape recorder, while the cartridge is held stably, thus this invention is very useful in practice.

What is claimed is:

1. In a tape recorder for receiving an insertable tape cartridge, said tape cartridge carrying a movable pinch roller and said tape recorder including a drive capstan positioned in the path of said insertable tape cartridge with said pinch roller pressing a tape carried thereby against the capstan for effecting tape movement after insertion, the improvement comprising:

a slide bar engageable with a slide plate, both said slide plate and said slide bar being movable in the direction of cartridge insertion in response to contact of one end of said slide plate with said cartridge, first latching means carried by said slide plate and engaging said slide bar to prevent contact between said slide bar and said movable pinch roller, and second latching means engaging said slide bar in response to full insertion of said cartridge and operative engagement of said pinch roller, said tape and said capstan, and means for releasing of said first latching means when said second latching means are engaged for permitting sound recording or reproducing, and means responsive to a condition of said running tape during recording or reproducing for releasing said second latching means to permit said slide bar to release said pinch roller from said capstan without movement of said inserted cartridge.

2. The tape recorder as claimed in claim 1, wherein said cartridge includes a spring biased pivotable pinch roler support lever carrying said movable pinch roller, including a face on said support lever engageable by one end of said slide bar.

3. The tape recorder as claimed in claim 1, further comprising a manual operating bar operatively associated with said slide bar for moving said slide bar away from said cartridge to operate said second latching means to latch said slide bar out of contact with said pinch roller support lever.

4. The tape recorder as claimed in claim 1, wherein said pinch roller is carried by a spring biased pinch roller support lever normally biasing said pinch roller outwardly of said cartridge for pressing said tape carried by said cartridge into contact with said drive capstan in the path of said insertable cartridge, and said pivotable pinch roller support lever includes a lever end face overlying an opening at the front of said cartridge adjacent said pinch roller, said slide plate is mounted within said tape recorder inwardly of said cartridge and includes a first elongated slot, a second elongated slot having its longitudinal axis aligned with that of said first slot and being further provided with a right angle slot portion, pins fixed to said recorder and projecting through respective slots and being spaced with respect to each other such that movement of said slide plate to a position where said pins are at corresponding ends of said slots allows said slide plate to pivot about the axis of the pin within said first slot to release said first latching means, said first latching means is mounted on said slide plate and is biased into latching engagement with said slide bar to maintain the end of said slide bar out of contact with said lever end face, said second latching means comprises a locking lever having a locking end normally spring biased into operative engagement with said slide bar and said means for releasing said second latching means comprises a solenoid responsive to the sensing of a tape condition for releasing said second latching means, and said tape recorder further comprises a manual operating bar operatively associated with said slide bar for moving the end of said slide bar away from said lever end face to the extent that said second latching means latches said slide bar in spring biased position and out of contact with the end face of said pinch roller support lever and thereby permits said pinch roller to press said tape against said capstan during tape replay, after reinsertion of the same cartridge or replacement thereof.

* * * * *